United States Patent
Natarajan et al.

(10) Patent No.: US 8,190,919 B2
(45) Date of Patent: May 29, 2012

(54) MULTIPLE STAKEHOLDER SECURE MEMORY PARTITIONING AND ACCESS CONTROL

(75) Inventors: Venkat Natarajan, Cupertino, CA (US); Jeremy Isaac Nathaniel Werner, San Jose, CA (US); Willy Obereiner, San Jose, CA (US); Joe Yuen Tom, Foster City, CA (US); Russell Barck, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1185 days.

(21) Appl. No.: 11/613,691

(22) Filed: Dec. 20, 2006

(65) Prior Publication Data
US 2008/0109662 A1    May 8, 2008

Related U.S. Application Data

(60) Provisional application No. 60/864,682, filed on Nov. 7, 2006.

(51) Int. Cl.
*G06F 21/00* (2006.01)
(52) U.S. Cl. .................................. 713/193
(58) Field of Classification Search ............. 713/193
See application file for complete search history.

(56) References Cited

U.S. PATENT DOCUMENTS

| 5,293,424 | A  | * | 3/1994  | Holtey et al. | 713/193 |
| 6,615,355 | B2 | * | 9/2003  | Mattison | 713/193 |
| 6,904,493 | B2 | * | 6/2005  | Chiao et al. | 711/103 |
| 2001/0048025 | A1 | * | 12/2001 | Shinn | 235/382 |
| 2002/0157010 | A1 | * | 10/2002 | Dayan et al. | 713/191 |
| 2004/0259633 | A1 |   | 12/2004 | Gentles et al. | |
| 2005/0005131 | A1 | * | 1/2005 | Yoshida et al. | 713/183 |
| 2005/0216651 | A1 | * | 9/2005 | Tanabiki et al. | 711/100 |
| 2006/0129848 | A1 | * | 6/2006 | Paksoy et al. | 713/193 |
| 2006/0194603 | A1 |   | 8/2006 | Rudelic et al. | |
| 2007/0150689 | A1 | * | 6/2007 | Pandit et al. | 711/170 |

OTHER PUBLICATIONS

International Search Report for PCT Application No. PCT/US 07/83826, mailed May 16, 2008, 9 pages.

* cited by examiner

*Primary Examiner* — Michael S McNally
(74) *Attorney, Agent, or Firm* — Turocy & Watson, LLP (57) ABSTRACT

A machine implemented system and method that effectuates secure access to a flash memory associated with a mobile device. The system includes a security component that intercepts transactions between an external processor and the flash memory and implements authentication and access control to the flash memory. The system further includes components that can partition the flash memory and can associate authentication and access control information with the partitioned flash memory.

20 Claims, 10 Drawing Sheets

MULTIPLE STAKEHOLDER SECURE MEMORY PARTITIONING AND ACCESS CONTROL

CROSS-REFERENCE

This application claims the benefit of U.S. Provisional Patent Application Ser. No. 60/864,682, entitled "MULTIPLE STAKEHOLDER SECURE MEMORY PARTITIONING AND ACCESS CONTROL", which was filed Nov. 7, 2006. The entirety of the aforementioned application is hereby incorporated by reference as if fully set forth herein.

BACKGROUND

Information stored on mobile devices/terminals can belong to multiple entities (e.g., device manufacturers, wireless signal operators/carriers, device users, etc.) and can be persisted on storage devices associated with the mobile devices/terminals. Information stored in associated storage devices can include, for example, operating system code supplied by device manufacturers to facilitate proper functioning of the mobile device/terminal, data and code related to, and necessary for, signal operators/carriers to effectuate communications between base stations and the mobile device/terminal, and user related code such as audio/video files that the user has downloaded to the mobile device/terminal.

To date such information has been stored in an arbitrary fashion wherein the storage associated with the mobile device has been utilized as being monolithic persisting means such that access to data has been accorded to all corners regardless their intent. Given the current reality that many users of mobile devices/terminal often employ their devices/terminals as repositories of sometimes sensitive personal information, such credit card numbers, social security numbers, that manufacturers of mobile devices/terminals and signal operators/carriers often require access to mobile devices in the field to upgrade and persist system and application code such as, operating systems, anti-virus software, e-mail applications, etc., users proclivity to want to download from secure and insecure sites on to their mobile devices, entertainment features, such as music files, video games, and the like. There is a need that such data be stored in specific partitions created on the mobile device and that these partitions be subject to authorization and access control in order to thwart introduction of suspect code and to prevent unauthorized access to secure data by persons with malicious intent.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter as disclosed and claimed herein relates generally to a device that provides hardware access control and cryptographic authentication. More specifically, the subject matter as claimed relates to a memory module that includes flash storage devices together with means and mechanisms to partition flash storage devices employed in industrial and consumer electronic components and to provide hardware access control and robust cryptographic authentication for access to each partition created.

In one aspect the claimed subject matter relates to systems and methods for creating partitions within memory modules associated with mobile devices/terminals, associating access rights and attributes to the created partitions, and controlling access to the created partitions based on the associated access rights and attributes and authentication credentials supplied by entities wishing to gain access to the create partitions.

In an alternative aspect the subject matter as claimed relates to systems and methods for granting and denying access to one or more partitions created within a memory module associated with mobile devices/terminals. Access to the one or more partitions can be granted or denied based on access rights and attributes associated with the partitions and biometric information elicited from an entity attempting to access the one or more partitions.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Information persisted in mobile devices/terminals (e.g. cell phones, Smart phones, Personal Digital Assistants (PDAs), handheld computers, laptops, multimedia players, and the like) such as code (e.g., device specific code supplied by device manufacturers, code supplied wireless signal operators/carriers, etc.) and data (e.g., user security information, audio/visual files, user preferences, address books, and the like) can belong to multiple entities (e.g., device manufacturers, wireless signal operators/carriers, device users, etc.). It is thus desired given the plurality of entities that might, or have need to, access the mobile device for various purposes, that the persisting means store information in a manner that provides availability, confidentiality, and integrity for each of these disparate entities. Robust authentication and access control can therefore be an important element to provide secure access to, and retrieval from, such secure persisting means. Additionally, it is further desired that authentication and access control mechanisms that provide such functionality be insusceptible to circumvention and not be overly burdensome to the user. Accordingly, the claimed subject matter provides a self contained access control and robust cryptographic authentication mechanism incorporated within the persisting means.

The claimed subject matter comprises a memory module that can include flash devices together with an Application Specific Integrated Circuit (ASIC) that provides access control mechanisms and robust cryptographic authentication. The flash devices can be NAND or NOR, a combination of NAND and NOR, some form of RAM, volatile memory in the memory module and/or the system, or any combination thereof. The memory module can be used, for example, in a mobile device, such as a cell phone. The ASIC controls the flash devices and monitors all traffic to and from the flash devices. A processing component associated with and/or incorporated within the ASIC provides both memory management as well as a secure environment to implement robust authentication and access control to the flash devices. The memory management aspect allows the flash devices to be dynamically and flexibly partitioned into various sizes and to be assigned appropriate access rights to each created partition. Each created partition can thereafter be associated with various entities that can control various aspects of the mobile device. For example, in the area of cell phones, entities can include the Handset OEM, Service Provider, Communication Carrier, Device Owner, and the Enterprise. For instance, the Operating System (controlled by the Handset OEM) can be stored in one partition, user confidential data can be stored in another partition, and private keys associated with a Digital Rights Management (DRM) agent can be stored in a third partition.

Figure 1:
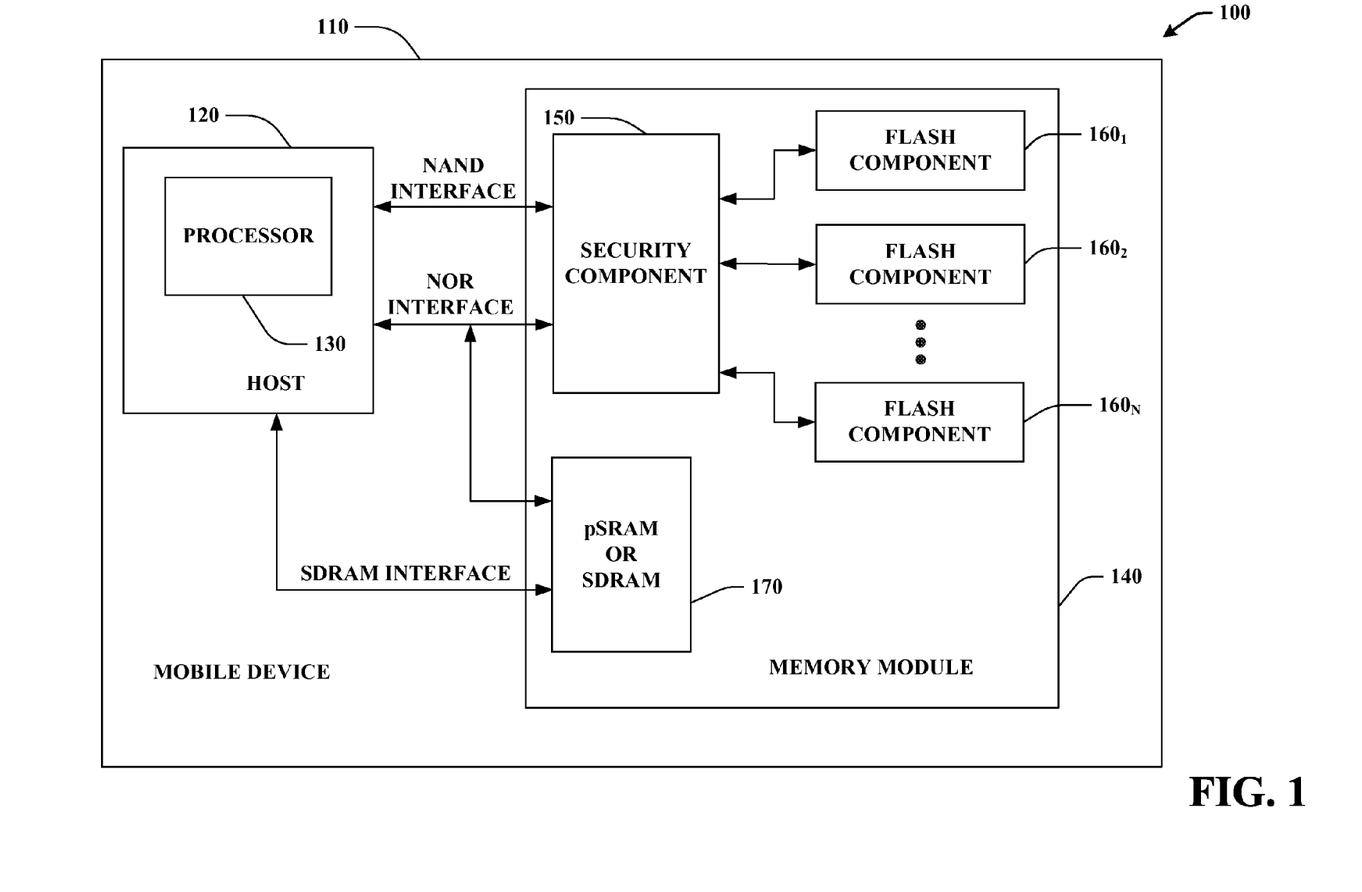
FIG. 1 illustrates a mobile device that includes a memory module in accordance with an aspect of the claimed subject matter.

FIG. 1 illustrates a system 100 that includes a mobile device 110 such as, for example, a cell phone, multimedia player, laptop, handheld computer, and the like. The mobile device 110 can include a host 120 that can be employed to perform a multitude of processing task associated with mobile device 110 such as establishing and maintaining consistent and clear wireless communications between a base station and the mobile device, for example. Host 120 that can comprise a processing unit 130 that can be any of commercially available processors that can be employed to effectuate the multitude of routine processing tasks typically related to the function of mobile devices. It should additionally be noted that processing unit 130 can employ dual processors and other multi-processor architectures.

Host 120 and its associated processing unit 130 can be in communication (e.g., via NAND and NOR interfaces) with a memory module 140 that can provide, through security component 150, secure access and robust authentication mechanisms necessary to access data and information stored in associated flash components $160_1, 160_2 \ldots 160_N$. As illustrated a first flash component $160_1$ through an Nth flash component $160_N$, N being an integer greater than or equal to one, can be utilized to persist information and data associated with multiple entities. The first flash component $160_1$ through Nth flash component $160_N$ can be referred to collectively as flash component 160. Additionally and/or alternatively, memory module 140 can also include random access memory such as SDRAM or v 170 that can be accessed by host 120 via associated interfaces. Moreover, memory module 140 can also arbitrate with host 120, and more particularly with processor 130 for access to flash component 160.

Figure 2:
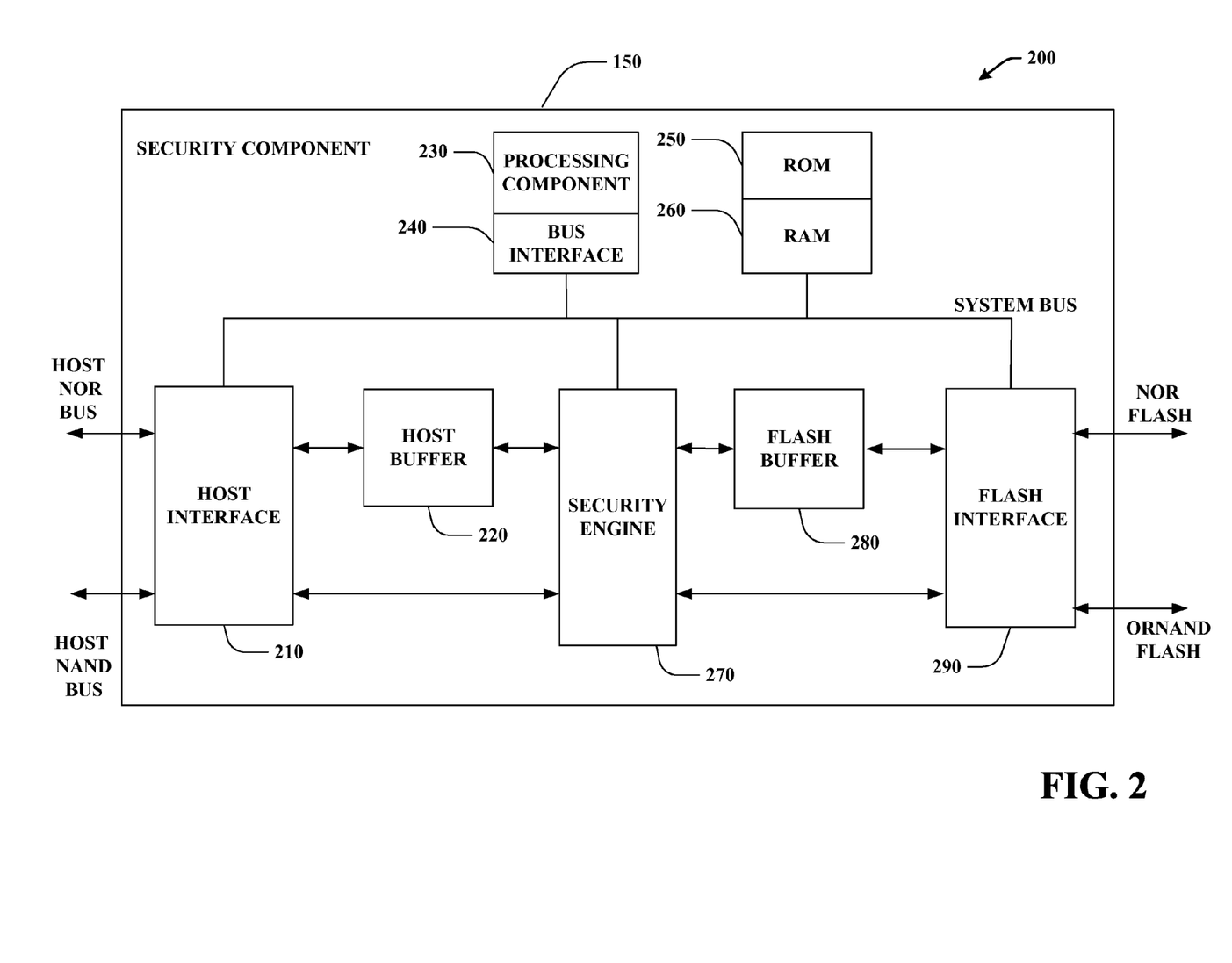
FIG. 2 provides a more detailed block diagram of a security component in accordance with one aspect of the claimed subject matter.

FIG. 2 depicts system 200 that is a more detailed illustration of security component 150 that can provide partitioning capabilities and robust authentication and access control to flash component 160 (see FIG. 1). Security component 150 can be in communication with an external host 120 and its associated processing unit 130 via host interface 210. Host interface 210 handles all NOR and NAND transactions with external host 120. Host interface 210 can ensure that signals to/from external host 120 comply with appropriate interface definitions for flash component 160, differentiate between secure and non-secure requests to/from the external host 120, and enforces access rights and permissions involving transactions with external host 120.

Host interface 210 can further be in communication, via bus interface 240 and a system bus, with host buffer 220 that holds data for secured transitions to/from external host 120. Additionally, host buffer 220 can serve as a mailbox between processing unit 230 and external host 120, wherein processing unit 230 interprets messages stored in the mailbox. Processing unit 230 executes various applications that can facilitate and effectuate partitioning of flash devices, ascertains whether access can be granted to entities requesting access to particular partitions, determines in concert with external host 120 whether authentication supplied by a requesting entity comports with corresponding authentication information that can be stored in associated RAM 250, ROM 260, and/or flash component 160, and can encrypt and decrypt data that is communicated between external host 120 and security component 150 to ensure against phishing and man-in-the middle attacks, for example. In addition, processing unit 230 can configure security engine 270 and can control data flow through security component 150.

Security component 150 can further include security engine 270 that can be configured by processing component 230. Security engine 270 performs all cryptographic authentications necessary to ensure that appropriate entities have and gain access to only those partitions to which they have access rights. Cryptographic functions such as, for example, encryption, decryption, key generation, and hash to facilitate authentication can be employed by security engine 270 in conjunction with processing component 230 and can include use of symmetric and asymmetric algorithms such as Advanced Encryption Standard (AES)—a block symmetric key cipher, Data Encryption Standard (DES), Triple Data Encryption Standard (3DES)—a block cipher form by utilizing the DES cipher at least three times, Secure Hash Algorithm (SHA) and its variants such as, for example, SHA-0, SHA-1, SHA-224, SHA-256, SHA-384, and SHA-512, and the Rivest, Shamir, and Adleman (RSA) encryption algorithm, to name but a few.

Security component 150 can in addition include flash buffer 280 that can hold data emanating from and being delivered to flash component 160. Utilization of flash buffer 280 can enable processing of a page of data while receiving the next page of data. It should be noted that host buffer 220 and flash buffer 280 can be symmetric as both can be utilized as both an input and output buffer depending on the direction of data flow. Such a symmetric arrangement can enable concurrency in that external host 120 can read from host buffer 220 while flash buffer 280 is being filled by flash component 160. Additionally, security component 150 can also include flash interface 290 that can handle all transactions to and from flash component 160 and security component 150 via utilization of both NOR and NAND interfaces, for example, through use of one parallel NOR interface and/or one serial NAND interface. It should noted that other components and modules, such an arbiter and a decoder can also be included within security component 150 and can disposed on the system bus.

Figure 3:
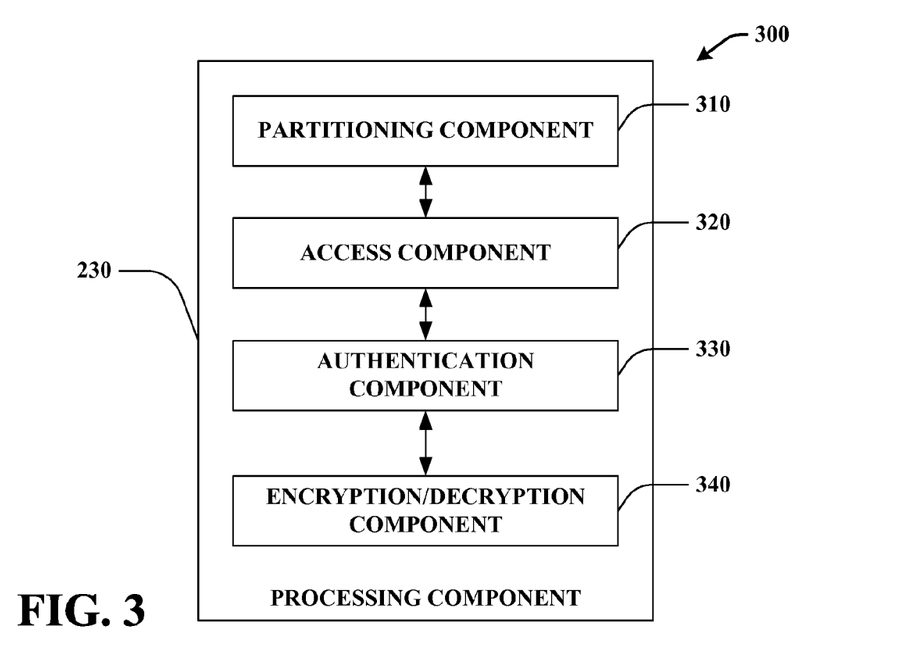
FIG. 3 provides a more detailed depiction of a processing component in accordance with another aspect of the subject matter as claimed.

FIG. 3 provides a more detailed depiction 300 of processing component 230. Illustrated therein processing component 230 includes a partitioning component 310 that can facilitate and effectuate partitioning of flash device 160, an access component 320 that can ascertain and determine in concert with associated ROM 250 and/or ROM 260 and one or more internal registers (not shown) associated with memory module 140 whether or not an entity attempting to access a particular partition has been assigned, or has appropriate, access rights to be granted access to the partition, an authentication component 330 that can elicit sufficient authentication information from an entity to ensure the identity of the entity requesting access to a particular partition, and a encryption/decryption component 340 that can encrypt/decrypt data communicated between external host 120 and the security component 150.

Partitioning component 310 can divide flash component 160 into multiple partitions. A partition can be created by specifying an identifier (e.g., GUID) that can be associated with the location of the flash component 160, the start address from whence the partition should commence, and an end address within the flash component 160. Since a created partition can typically span over multiple erase units the start and end addresses can be rounded to erase units. Moreover, since a partition can typically exist in one of two states, "open" or "closed", partitioning component 310 can upon appropriate command being issued can change the state. Thus, where a partition is in an "open" state, partitioning component 310 upon receipt of a command can, with proper authentication, close the partition. Conversely, where a partition is set to a "closed" state, partitioning component 310 can place the partition in an "open" state on receipt of an appropriate command.

Access component 320 can assign and determine access types and rights to partitions created by partitioning component 310. Typically access types that can be assigned by the access component 320 to a partition can include, but are not limited to, "read", "write", and "change access right". Further access component 320 can also assign and ascertain access permissions associated with a partition. Access permissions can include one of: "ALWAYS, WHEN_OPEN, WITH_PKI, or WHEN_OPEN_OR_WITH PKI", wherein access permission "ALWAYS" indicates that access to a partition is always allowed, "WHEN_OPEN" indicates that access to the partition is allowed only when a partition is in an "open" state, "WITH_PKI" denotes that access to a partition is permitted only when appropriate PKI (Public Key Infrastructure) authentication information has been supplied, and "WHEN_OPEN_OR_WITH PKI" connotes that access is allowed when a partition is in an "open" state or when appropriate PKI authentication information has been supplied.

In addition, access component 320 can further set partition attributes on the "change access right" access type to: "ALWAYS", "WITH_PASSWORD", "WITH_PKI", and "WITH_PASSWORD_OR_WITH_PKI", wherein when a change access right attribute set to ALWAYS is indicative that access rights on a partition can always be changed, "WITH_PASSWORD" denotes that access rights can only be changed when an appropriate password is supplied by the entity requesting the change, "WITH_PKI" indicates that access rights to the partition can only be change when appropriate PKI authentication information is supplied by the entity requesting the change, and "WITH_PASSWORD_OR_WITH_PKI" requires that the entity requesting the access change supply with either an appropriate password or relevant PKI authentication information.

Authentication component 330 can receive and retrieve credential information (such as biometric information and/or password information) associated with an entity attempting to access one or more flash partition. In addition authentication component 330 can manage and maintain credential information which can be stored in associated ROM 250 and/or RAM 260, and/or alternative such credential information can also be stored in one or more of the flash component 160. Authentication component 330 can, in addition to merely receiving credential information, can also solicit additional credential information where the authentication component 330 deems such information may be necessary to appropriately establish the identity of the entity seeking access to a particular partition. Authentication component 330, upon receipt of credential information from an entity, can consult with stored credential information (e.g., in associated ROM 250, RAM 260 and/or flash component 160) and upon identifying a correspondence between the supplied credential information and the stored credential information can grant and/or indicate to access component 320 the appropriate access that should be accorded to the requesting entity.

Encryption/decryption component 340 provides one or more encryption/decryption facility to ensure that communications between the security component 150 and external host component 120 are not compromised by one of the many malicious extant viruses. The encryption/decryption component 340 can utilize one or more encryption/decryption mechanisms to obscure data communicated between security component 150 and external host 120. Examples of encryption/decryption mechanisms that can be employed to obscure the data can include utilization of hashing algorithms, public key encryption, elliptic curve encryption, and the like.

Figure 4:
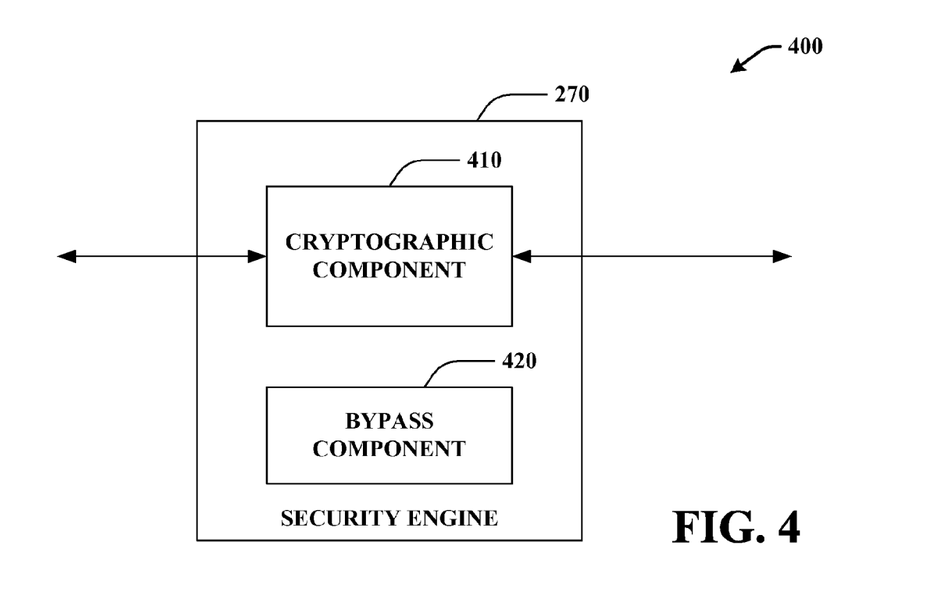
FIG. 4 provides, in accordance with a further aspect of the claimed subject matter, a more detailed illustration of a security engine.

FIG. 4 provides a more detailed illustration 400 of security engine 270. Security engine 270 can include cryptographic component 410 that provides hardware access control to flash component 160 and a bypass component 420 that allows an external host 120 to directly access flash component 160. It should be noted however that while bypass component 420 permits an external host 120 to access flash component 160, such access is facilitated, effectuated and continuously monitored and controlled by security engine 270, and that bypass access to flash component 160 in this manner typically cannot be effectuated without going through security component 150, and more particularly without going through security engine 270 and bypass component 420. Bypass component 420 thus in order to provide access to flash component 160 monitors the address and type of access and prevents access to partitions by entities not currently permitted according to a partition definition and a current state of the partition. For example, if a read access to a partition is allowed only when the partition is OPEN and currently the partition is closed, then any read access to that partition is barred. A similar functionality can be effectuated with respect to cryptographic component 410 where access to partitions is protected in concert with a partition definition associated with each created partition. Thus for example, where a partition requires PKI authentication for write access, then for an entity attempting to access and write to the partition, the entity must present appropriate PKI credentials to write to the partition.

Figure 5:
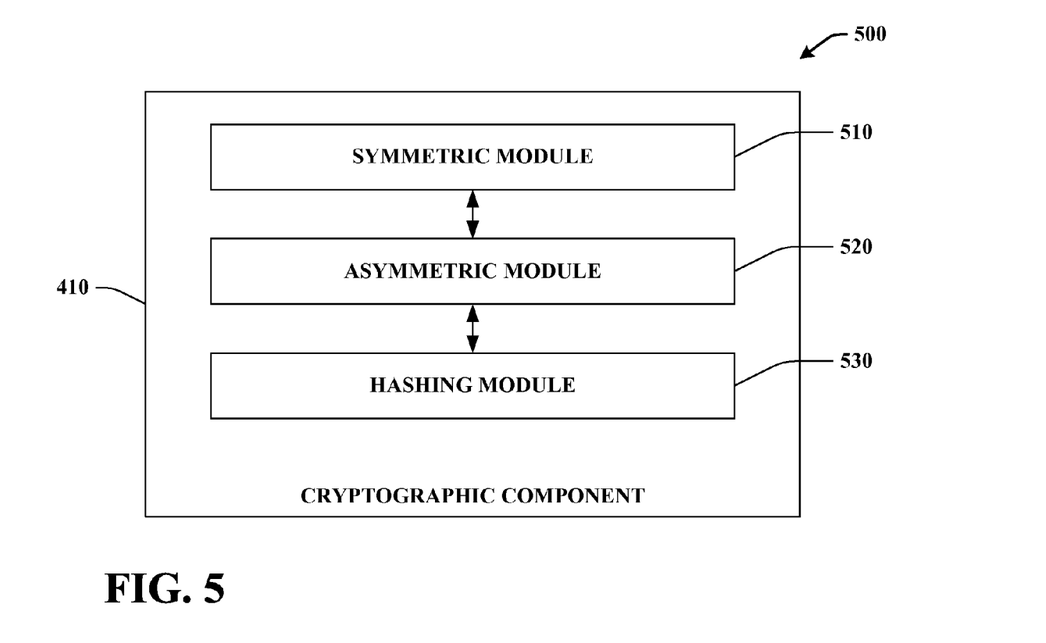
FIG. 5 provides a more detailed block diagram of a cryptographic component that can be included with an aspect of the subject matter as claimed.

FIG. 5 provides a more detailed illustration 500 of cryptographic component 410. As illustrated, cryptographic component 410 can include symmetric module 510 that provides symmetric cryptographic tools and accelerators (e.g., Twofish, Blowfish, AES, TDES, IDEA, CAST5, RC4, etc.) to ensure that partition component 160, or portions thereof, can only be accessed by those entities authorized and/or authenticated to do so. Cryptographic component 410 can also include asymmetric module 520 that provides asymmetric cryptographic accelerators and tools (e.g., Diffie-Hellman, Digital Signature Standard (DSS), Elliptical Curve techniques, RSA, IKE, PGP, and the like) to ensure that partition component 160, or portions thereof, are only accessed by those entities that are authorized and certified to do so. Additionally, cryptographic component 410 can include hashing module 530 that, like symmetric module 510 and asymmetric module 520, can provide accelerators and tools (e.g., Secure Hash Algorithm (SHA) and its variants such as, for example, SHA-0, SHA-1, SHA-224, SHA-256, SHA-384, and SHA-512) to ensure that access to partition component 160 is confined to those entities authorized to gain access.

Figure 6:
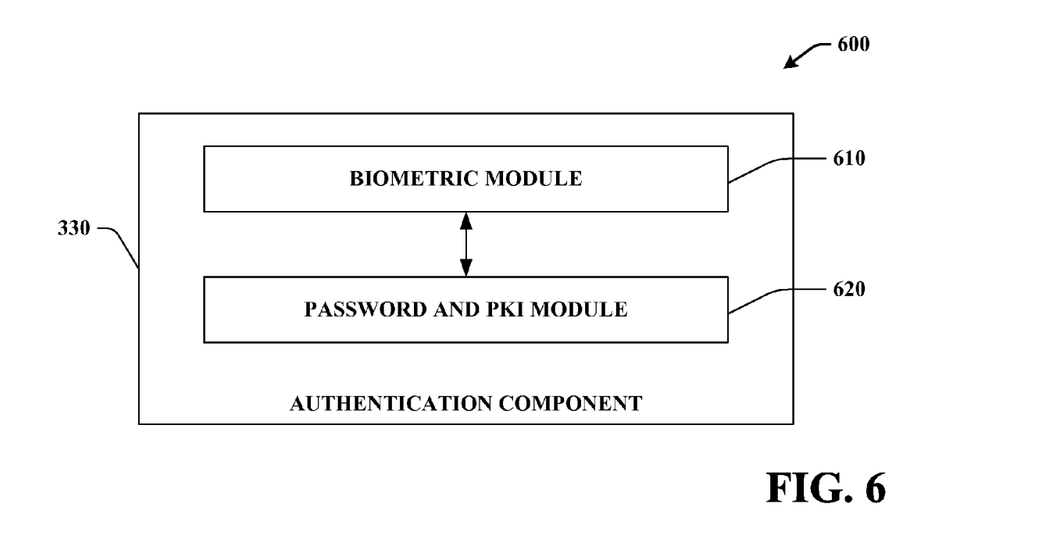
FIG. 6 provides a more detailed depiction of an authentication component in accordance with the disclosed subject matter.

FIG. 6 provides a more detailed depiction 600 of authentication component 330. Authentication component 330 can include a biometric module 610 and password and PKI module 620. Biometric module 610 can implement one or more machine implemented methods to identify an entity by its unique physical and behavioral characteristics and attributes. Biometric modalities that can be employed by biometric module 610 can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

Password and pki module 620 can solicit authentication data from an entity whereupon the authentication data so solicited can be employed, individually and/or in conjunction with information acquired and ascertained by the biometric module 610, to control access to flash component 160. The authentication data can be in the form of a password (e.g., a sequence of humanly cognizable characters), a pass phrase (e.g. a sequence of alphanumeric characters that can be similar to a typical password but is conventionally of greater length and contains non-humanly cognizable characters in addition to humanly cognizable characters), a pass code (e.g., Personal Identification Number (PIN)), and the like. Additionally and alternatively, public key infrastructure (PKI) data can also be employed by password and pki module 620. Public key infrastructure (PKI) arrangements provide for trusted third parties to vet, and affirm, entity identity through the use of public keys that typically are certificates issued by the trusted third parties. Such arrangements enable entities to be authenticated to each other, and to use information in certificates (e.g., public keys) to encrypt and decrypt messages communicated between entities.

Figure 7:
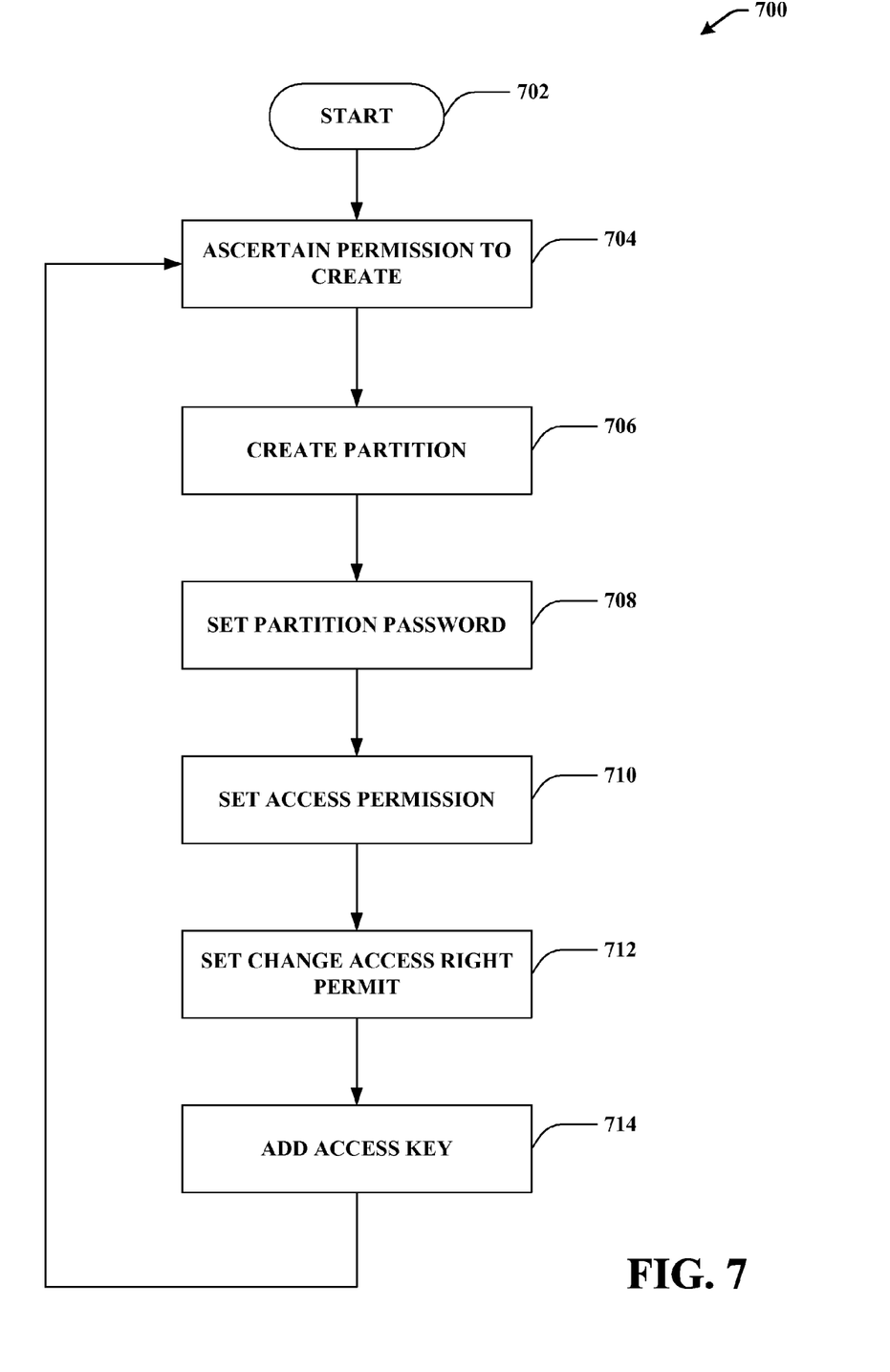
FIG. 7 illustrates a machine implemented methodology for creating partitions in flash memory associated with mobile devices/terminals in accordance with an aspect of the claimed subject matter
Figure 8:
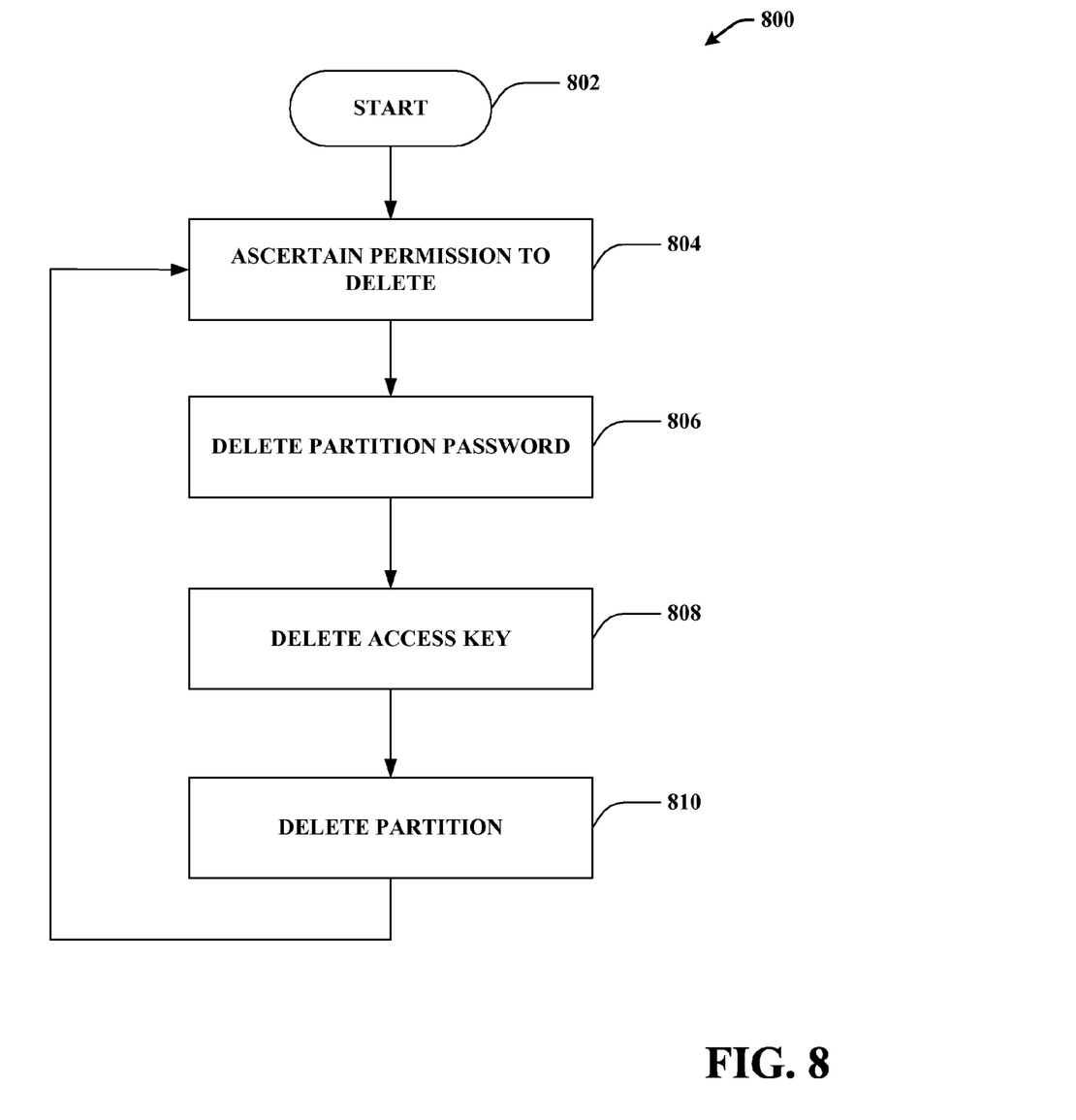
FIG. 8 depicts a computer implemented method for deleting partitions created in flash memory associated with mobile devices/terminals in accordance with another aspect of the subject matter as claimed.
Figure 9:
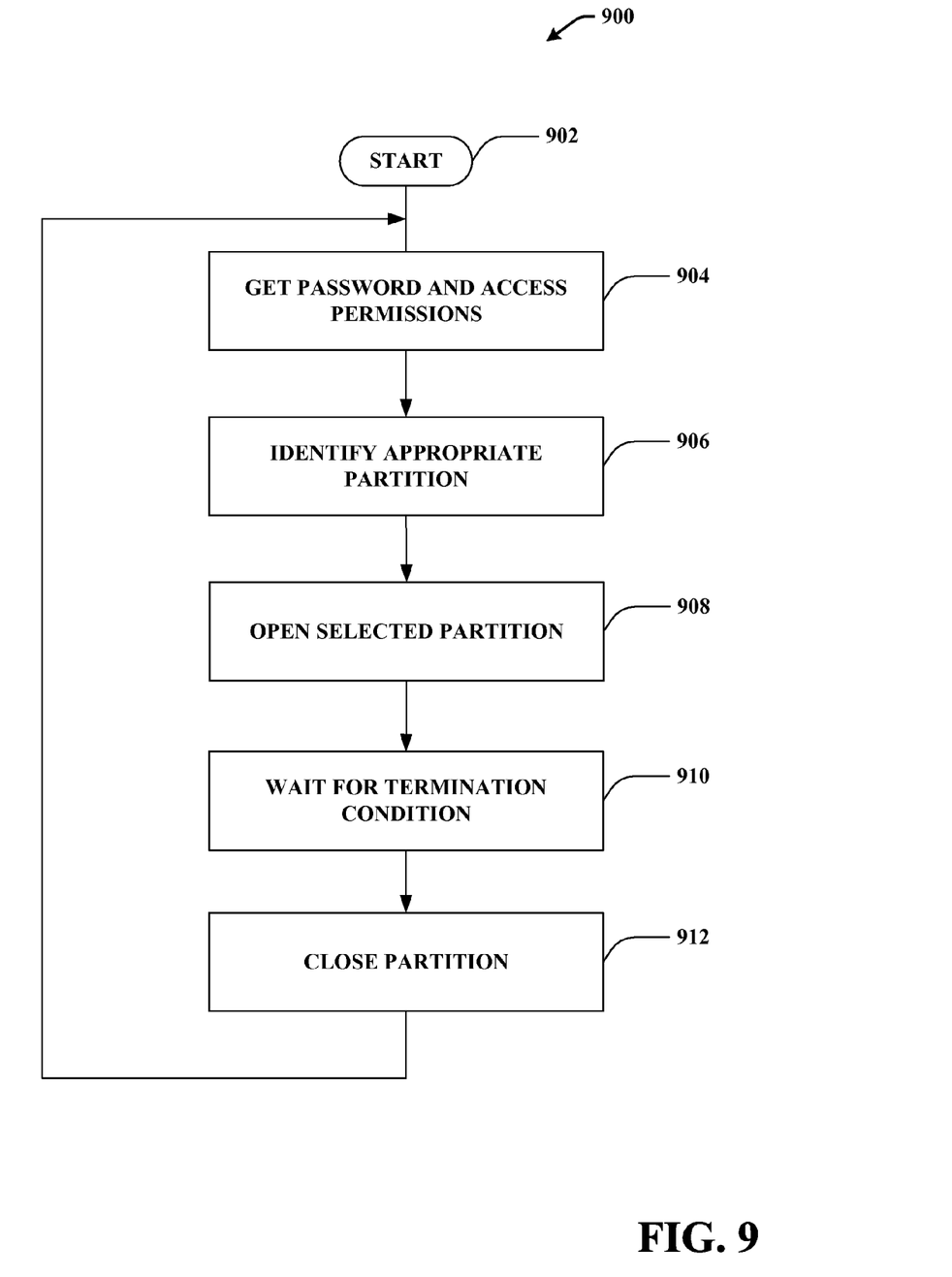
FIG. 9 illustrates a methodology for accessing flash partitions created in flash memory associated with mobile devices/terminals in accordance with the disclosed subject matter.

In view of the exemplary systems shown and described supra, methodologies that may be implemented in accordance with the disclosed subject matter will be better appreciated with reference to the flow chart of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 illustrates a machine implemented methodology 700 for creating partitions in flash memory associated with mobile devices/terminals. Method 700 commences at 702 where various processor initializations tasks and background activities can be performed. Once these initialization tasks and activities have been performed, the method proceeds to 704 where authentication information (e.g., passwords) is solicited and permissions (e.g., access control data) to create partitions are ascertained. Having ascertained at 704 that appropriate permissions exist to create a partition, the method proceeds to 706 where a partition is created. Creation of a partition can involve determining contiguous blocks of unutilized flash memory and/or locating non-contiguous unutilized memory blocks that can be grouped to form a particular partition. At 708 a partition password can be assigned to the created partition. At 710 access permissions, such as "read", "write", and "change access right" can be associated with the created partition. At 712 a change access right attribute can be set and associated with the created partition. Change access right attributes can be set, for example, to ALWAYS, WITH_PASSWORD, WITH_PKI, and WITH_PASSWORD_OR_WITH_PKI. At 714 an access key such as a PKI key can be generated and associated with the create partition thus ensuring that only entities that have corresponding PKI keys can access the created partition.

FIG. 8 depicts a machine implemented method 800 for deleting partitions created in flash memory associated with mobile devices/terminals. The method commences at 802 at which point initializations and background activities can take place. The method then proceeds to 804 where authentication information (e.g., passwords) is solicited and permissions (e.g., access control data) to delete partitions are ascertained. Method 800 then proceeds to 806 where passwords and authentication keys associated with the partition at issue are deleted. At 808 the methodology proceeds to delete access rights associated with the partition. At 810 the method deletes the partition and/or the content contained within the partition. Deletion of partitions, for example, can entail setting or initializing all the memory blocks within the partition range to zero (0) and/or one (1).

FIG. 9 illustrates a machine implemented method 900 for accessing flash partitions created in flash memory associated with mobile devices/terminals. Method 900 commences at 902 where various initialization tasks and background activities can be performed. Upon completion of the initialization tasks and associated background activities the method proceeds to 904 where authentication and control access permissions are elicited from an entity attempting to access flash memory. Upon receipt of authentication and control access permission information the method proceeds to 906, whereupon based at least on the supplied authentication information a partition associated with the authentication information can be identified. At 908, depending on the state of the partition selected, can open the selected partition and prepare it for appropriate access (e.g. read, write, read and write, etc.). At 910 the method can enter a wait state wherein a termination condition such as a request to close the partition is received. Typically, requests to "open" and "close" partitions will be received from an external host. Nevertheless, "open" and "close" indications can be received from other components associate with the system. At 912 having received an appropriate indication to close the partition can initiate changing the state of the partition from "open" to "close" and can undertake ancillary tasks associated with closing the partition.

Figure 10:
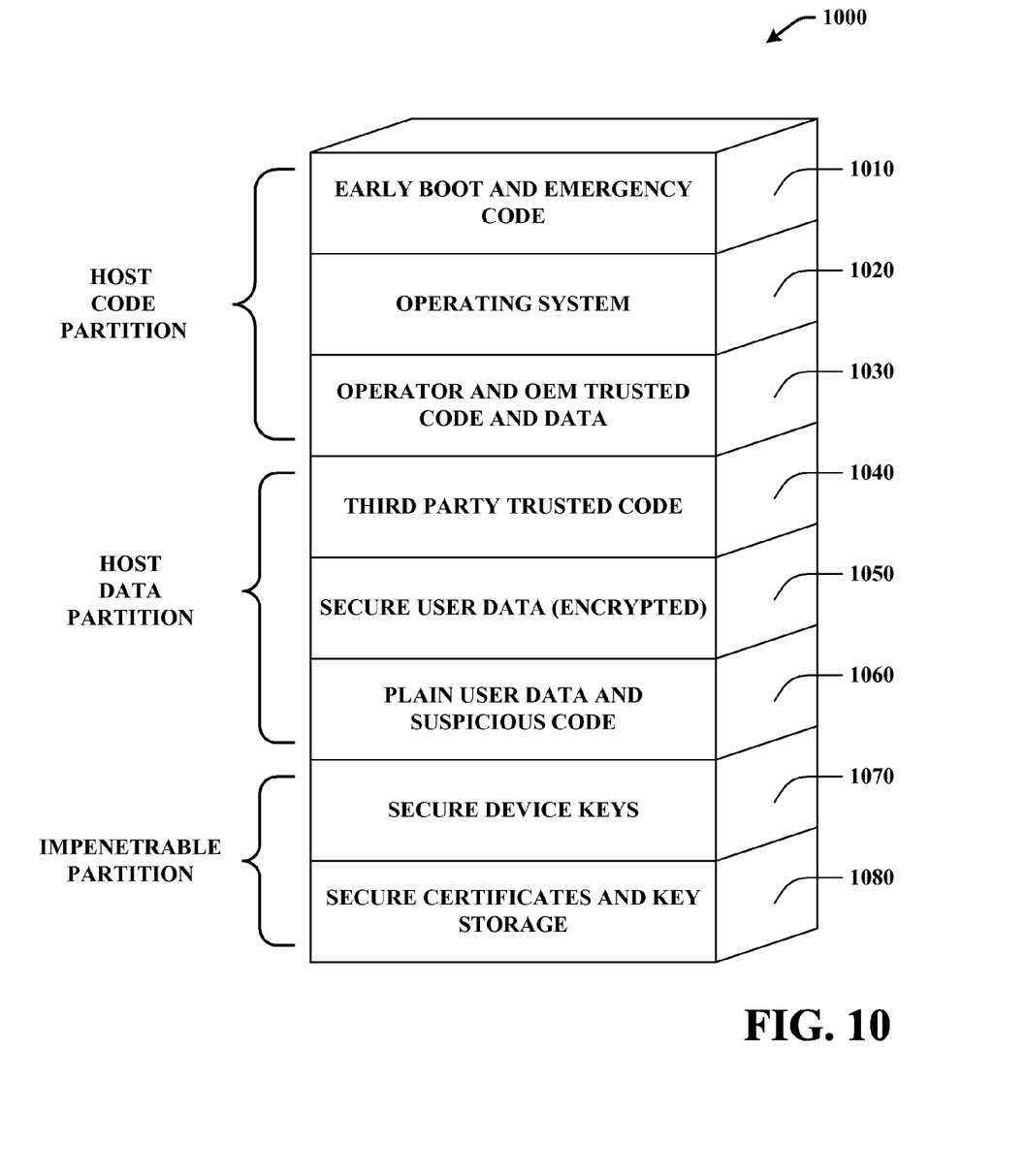
FIG. 10 depicts an illustrative stack of protection in accordance with one aspect of the claimed subject matter.

FIG. 10 illustrates a tower or stack of protection 1000 in accordance with one aspect of the claimed subject matter. The stack of protection 1000 for purposes of illustration depicts three partitions (Host Code Partition, Host Data Partition, and an Impenetrable partition). Host Code Partition can comprise an early boot and emergency code partition 1010, an operating system partition 1020 and an operator and OEM trusted code and data partition 1030. Further, Host Data Partition can include a third party trusted code partition 1040, secure user data (encrypted) partition 1050, and plain user data and suspicious code partition 1060. Additionally, the Impenetrable partition can include a secure device keys partition 1070 and a secure certificates and key storage partition 1080.

As depicted the stack of protection 1000 provides a multi-layered approach to ensure memory tamper protection and effective virus recovery. For example, Host Code Partition, and sub-partitions (e.g. sub-partitions 1010-1030) contained therein, may be viewable and accessible by all entities, but only be modifiable by entities related to the manufacturer of the mobile device/terminal. Thus, sub-partition 1010, for instance may allow all entities to read and view the contents contained in sub-partition 1010, but may only allow entities that supply appropriate credentials (e.g. PKI authentication information) to write or modify the contents of sub-partition 1010. Sub-partitions 1020 and 1030 on the other hand may only allow select entities to read and write content of these partitions, and more particularly, may only permit entities to read the contents of sub-partitions 1020 and 1030 once, for example, an afterboot state has been established by security component 150, and additionally may only allow entities that further supply appropriate credentials (e.g., PKI authentication information) to write or modify partitions 1020 and 1030.

Further, Host Data Partition and its illustrative sub-partitions (e.g., 1040-1060) may also only allow selective access to particular partitions. For example, sub-partition 1040—third party trusted code—may only allow entities to read the contents of sub-partition 1040 once an after boot state has been ascertained by security component 150 for example, and may allow entities that proffer an appropriate password write access, sub-partition 1050—secure user data (encrypted)—may only allow read and write access to those entities that supply an appropriate pass phrase, pass code, and/or password, and sub-partition 1060—plain user data and suspicious code—may allow read and write access without necessity of entities providing authentication credentials.

Additionally, the Impenetrable partition and its sub-partitions (e.g., 1070-1080) may only allow read access to a very select and restrictive group of entities, such as the security component itself, indicating that these are the most secure partitions and that they cannot be read without the security component that create the respective sub-partitions. However, while the Impenetrable partition and its sub-partitions may confine read access to its sub-partition to a select and restrictive group, these partitions may allow write permission where proper authentication is provided by the entity.

As used in this application, the terms "component", "module", and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects of designs. Rather, use of the word exemplary is intended to present concepts in a concrete fashion.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
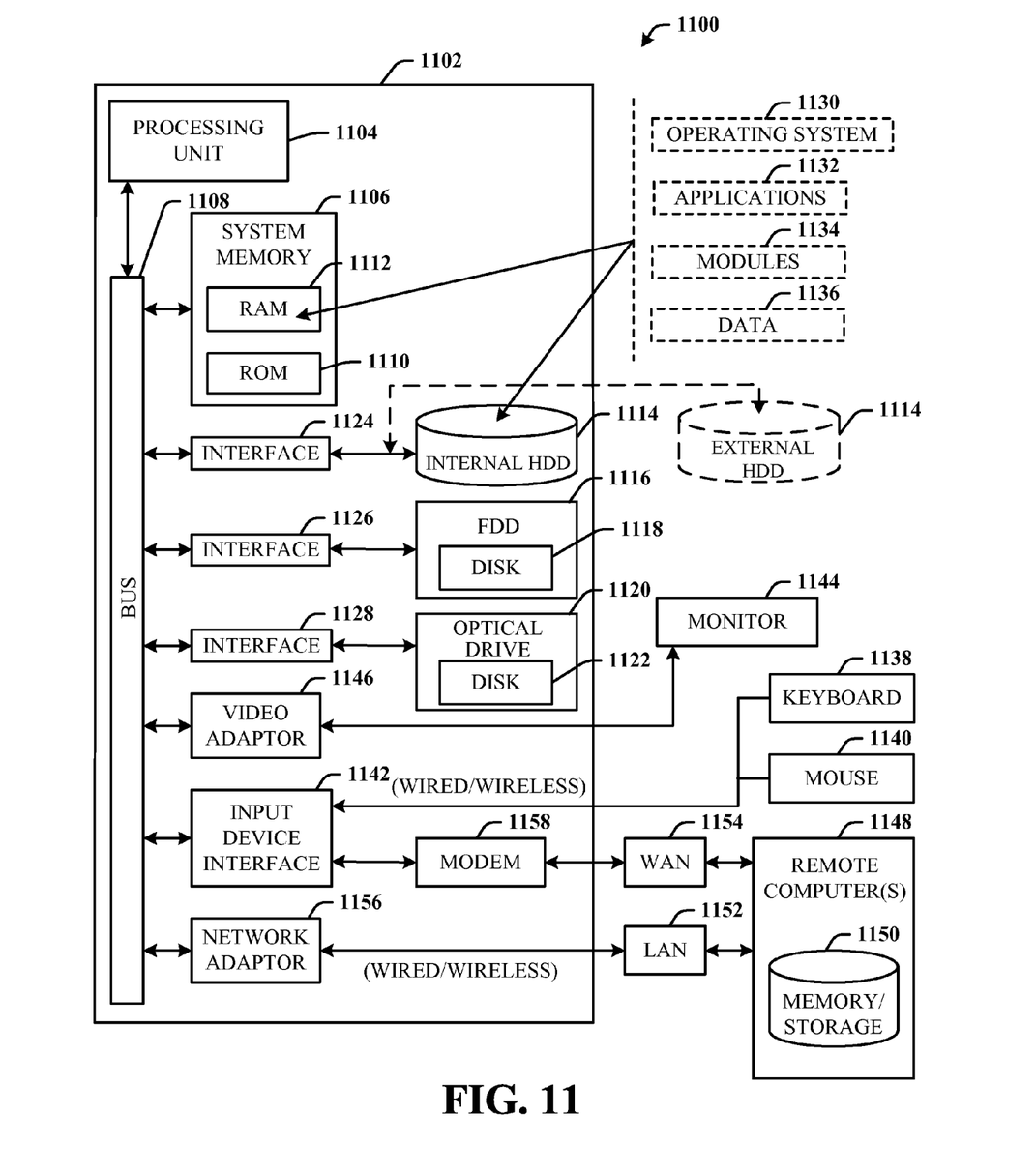
FIG. 11 illustrates a block diagram of a computer operable to execute the disclosed inference-based query completion architecture.

Referring now to FIG. 11, there is illustrated a block diagram of a computer operable to execute various aspect of the disclosed and claimed subject matter. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adaptor 1156. The adaptor 1156 may facilitate wired or wireless communication to the LAN 1152, which may also include a wireless access point disposed thereon for communicating with the wireless adaptor 11156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 12:
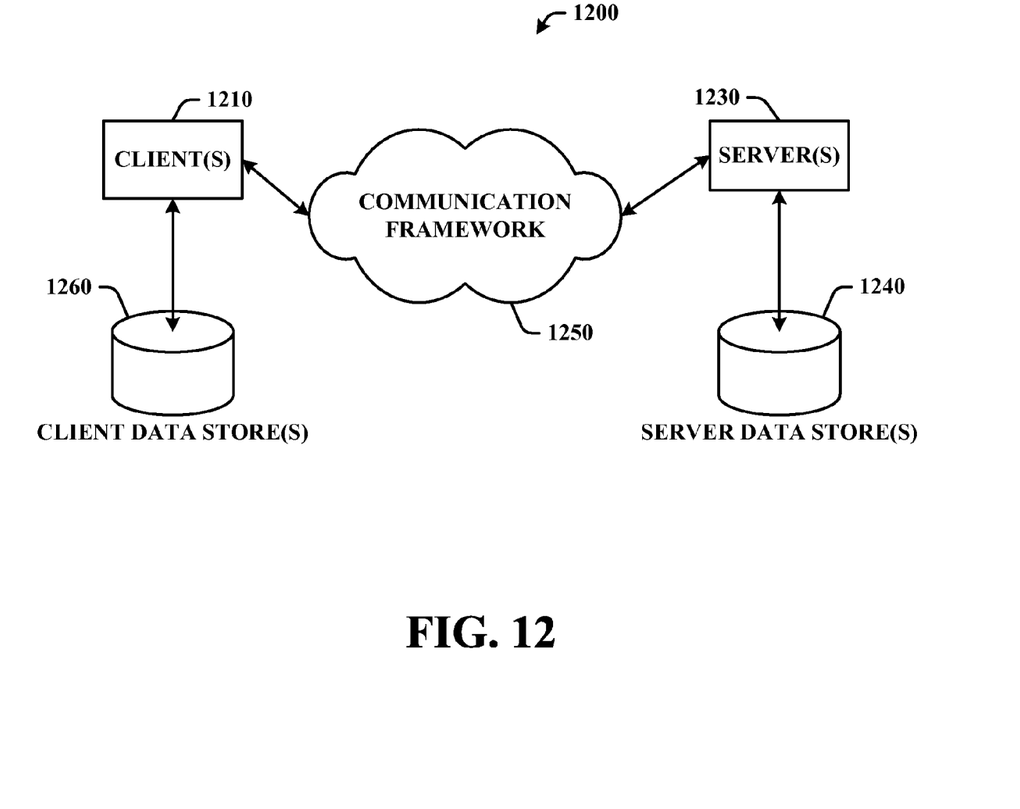
FIG. 12 illustrates a schematic block diagram of an exemplary computing environment for processing the inference-based query completion architecture in accordance with another aspect.

Referring now to FIG. 12, there is illustrated a schematic block diagram of an exemplary computing environment 1200 for processing the inference-based query completion architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that effectuates secure access to a flash memory component, comprising:
    a security component that intercepts communications between an external processor and the flash memory component and implements authentication and access control to the flash memory component, wherein, based on the security component receiving appropriate public key infrastructure authentication information associated with a partition formed within the flash memory and the partition being in an open state, the security component permits access to the partition, wherein the partition is further associated with a change access right access type that requires a password and the appropriate public key infrastructure authentication information to be supplied in order to change the change access right access type; and
    a processing component that rounds a start address or an end address to an erase unit boundary of the flash memory component.

2. The system of claim 1, the processing component divides the flash memory component into the partition based on a unique identifier associated with the flash memory component and the start address and the end address.

3. The system of claim 2, the processing component associates a state to the partition, the state includes one of an open state and a close state.

4. The system of claim 3, the processing component associates an access permit to the partition, the access permit includes at least one of a PKI certificate, an unrestricted access, and access allowed when the state associated with the partition is the open state.

5. The system of claim 1, the processing component associates an access type to the partition.

6. The system of claim 5, the access type includes one of read, write, or change access right.

7. The system of claim 6, the change access right comprises partition attributes that include a partition attribute that indicates that the partition is always changeable, a partition attribute that indicates that the partition is changeable when a password is supplied, a partition attribute that indicates that the partition is changeable when appropriate public key infrastructure authentication information is supplied, or a partition attribute that indicates that the partition is changeable when an appropriate public key infrastructure authentication information or password is supplied.

8. The system of claim 1, the security component further includes a security engine that implements hardware access control.

9. The system of claim 8, the security engine includes a cryptographic component that implements one or more symmetric and asymmetric cryptographic techniques to enforce hardware access control over the flash memory component.

10. The system of claim 1, the security component implemented on a application specific integrated circuit.

11. The system of claim 1, the flash memory component, the security component and the external processor integrated to form a mobile device, the flash component and the security component embedded in the mobile device.

12. A method implemented on a processor for facilitating and effectuating secure access to a flash memory component, comprising:
    intercepting communications between an external host and the flash memory; and
    utilizing a cryptographic technique to enforce the secure access to the flash memory component that is partitioned based on a start address or an end address that are rounded to an erase unit boundary of the flash memory component, wherein enforcement of the secure access includes utilization of appropriate public key infrastructure authentication information and the flash memory that is partitioned being in an open state, and wherein the flash memory that is partitioned is associated with a change access right access type of with password or with pki, wherein the change access right access type of with password or with pki requires that a password or the appropriate public key infrastructure authentication information be supplied in order to modify the change access right access type associated with the flash memory that is partitioned.

13. The method of claim 12, the cryptographic technique includes utilizing a symmetric cryptographic algorithm, an asymmetric cryptographic algorithm and a secure hashing algorithm to deny access to a partition created within the flash memory component.

14. The method of claim 13, further including soliciting credential information from an entity requesting access to the partition.

15. The method of claim 14, utilizing the credential information to grant one or more of a read, a write, and a change access right access type to the partition.

16. The method of claim 13, further including eliciting biometric information from the entity requesting access to the partition.

17. The method of claim 16, the biometric information includes at least iris data, face data and fingerprint data.

18. The method of claim 12, the processor, the external host and the flash memory incorporated to form a mobile device.

19. The method of claim 18, the mobile device one of a multimedia player, a Personal Digital Assistant, a cell phone, a lap top computer, and a hand held computing device.

20. A method that divides a flash memory component into one or more partitions, comprising:
    partitioning the flash memory component into the one or more partitions, wherein a start or end address of the one or more partitions is aligned on an erase unit boundary of the flash memory component;

assigning a pass code to the one or more partitions; and ascertaining and associating a public key infrastructure (PKI) key and an access control attribute to the one or more partitions, wherein access to the one or more partitions is permitted when the one or more partitions are in an open state and the access control attribute is set to when_open_or_with_PKI, wherein the access control attribute when_open_or_with_PKI permits access to the one or more partitions in response to one of the one or more partitions being in an open state and an appropriate PKI key being supplied.

* * * * *